United States Patent

[11] 3,623,478

| [72] | Inventor | Joseph M. Saba<br>Wayland, Mass. |
|---|---|---|
| [21] | Appl. No. | 888,200 |
| [22] | Filed | Dec. 19, 1969 |
| [45] | Patented | Nov. 30, 1971 |
| [73] | Assignee | Technical Resources, Inc.<br>Waltham, Mass. |

[54] RECORDING SPHYGMOMANOMETER
4 Claims, 4 Drawing Figs.

[52] U.S. Cl. .................................................. 128/2.05 Q,
128/2.05 M, 128/2.05 SP
[51] Int. Cl. .................................................. A61b 5/02
[50] Field of Search ........................................ 128/2.05 A,
2.05 M, 2.05 Q, 2.05 R, 2.05 S, 2.05 SP; 116/29

[56] References Cited
UNITED STATES PATENTS

| 2,447,018 | 8/1948 | Keinath | 128/2.05 Q |
| 3,117,570 | 1/1964 | Halasz et al. | 128/2.05 M |
| 2,875,750 | 3/1959 | Boucke et al. | 128/2.05 A |
| 747,157 | 12/1903 | Fahrney | 128/2.05 Q |
| 2,379,573 | 7/1945 | Gilson | 128/2.05 A |
| 3,085,567 | 4/1963 | Vigilante | 128/2.05 A |
| 3,095,873 | 7/1963 | Edmunds, Jr. | 128/2.05 A |

OTHER REFERENCES

The Lancet, April 13, 1963, pp. 808– 809, (copy in Gr. 335) (128/2.05 A)

Amer. Heart Journ., March, 1959, Vol. 57, pp. 361– 370 (copy in Gr. 335, 128/2.05 Q)

*Primary Examiner*—Richard A. Gaudet
*Assistant Examiner*—Kyle L. Howell
*Attorney*—Kenway, Jenney & Hildreth ABSTRACT: A recording sphygmomanometer adapted to print systolic and diastolic pressure indicia to form a permanent record on a heat sensitive sheet. Microphone impulses from a pressure cuff are amplified to produce current in a heating element mounted on the pointer of a manometer. The record sheet may have a printed scale adjacent the heating element and accurately positioned in relation thereto.

PATENTED NOV 30 1971 3,623,478

INVENTOR
JOSEPH M. SABA

BY Kenway, Jenney
& Hildreth
ATTORNEYS

INVENTOR
JOSEPH M. SABA

BY Kenway, Jenney
& Hildreth

ATTORNEYS

(54) 3,623,478

RECORDING SPHYGMOMANOMETER

BACKGROUND OF THE INVENTION

This invention relates generally to recording sphygmomanometers. More particularly, it relates to an instrument of simplified, portable construction, providing a permanent and reliable record of a patient's systolic and diastolic pressures.

Aneroid manometers, having dials calibrated in appropriate units for measuring blood pressure, have been shown to provide reliable blood pressure readings when used in conjunction with a pressure cuff, a manually operated squeeze bulb for inflating the cuff and a bleeder valve for controlled release of pneumatic pressure. The method now most widely used is visual. The physician hears the pressure pulses with a stethoscope, observes the needle movement and writes down the pressures observed. This method involves a degree of skill and judgment, and various human errors may occur.

To avoid such errors, various more sophisticated recording instruments have been developed, and most of these are associated in function with aneroid manometers. The lack of general acceptance for such instruments results from a number of factors, among which are the complexity of construction with attendant high cost, the difficulty of maintenance, and in some cases unreliable performance and the need for skilled operators. In some instances, there is a possibility that substantial errors may occur in the readings recorded. This may be due to certain operating characteristics of the sensing and recording means employed, which introduce variables into the parameters that affect the sensitivity of the instruments.

SUMMARY OF THE INVENTION

This invention provides an instrument so designed as to provide a permanent record of pressure readings on a heat sensitive sheet by means of a simple structure in which the manometer is free of mechanical loading that may affect its sensitivity and calibration. The instrument is adapted to provide a permanent record in conjunction with audible and visible indicia corresponding to the systolic and diastolic pressure levels, as desired.

DESCRIPTION OF THE PREFERRED EMBODIMENT

Figure 1:
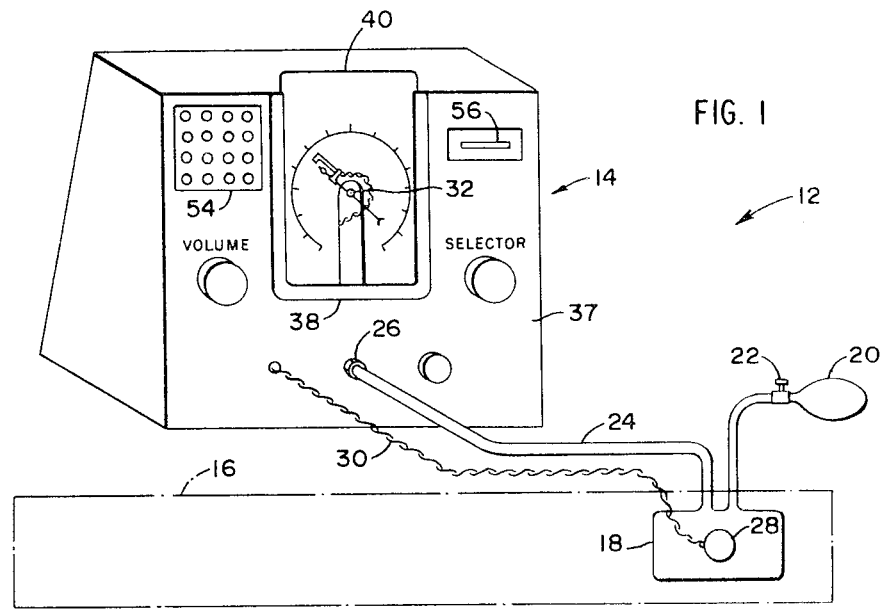
FIG. 1 is a general view of the preferred form of recording sphygmomanometer, shown with a pressure cuff attached.

Referring to FIG. 1, the recording sphygmomanometer, designated generally at 12, comprises a recording instrument 14 and a pressure cuff 16. The pressure cuff is of conventional form and includes an airtight bag 18 and a cloth wrap providing means to secure the bag about a patient's limb in close proximity to an artery. The bag 18 has the usual hand bulb 20 and bleeder valve 22 for inflating and deflating the bag. The bag has a tube 24 for connection to a fitting 26 on the recording instrument.

Also mounted in the bag, or otherwise in equivalent acoustic communication with the wall of the bag, is a crystal, ceramic or magnetic microphone 28 connected by leads 30 to the recording instrument.

Figure 3:
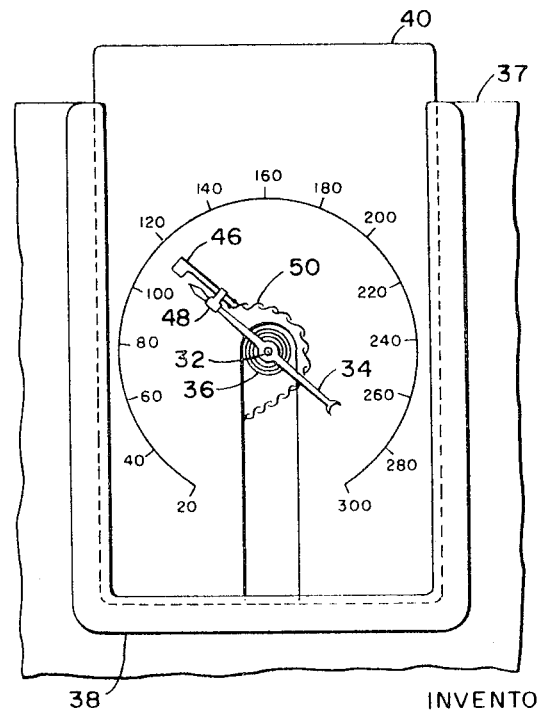
FIG. 3 shows a record sheet inserted in the instrument in position for making a record.

The fitting 26 has an internal connection to an aneroid manometer which, except as specifically described below, is preferably of conventional construction. The movable portion of the manometer is connected through the usual linkages to a pivotal spindle 32 extending forwardly through the face of the instrument. A needle 34 (FIG. 3), fitted with the usual coiled return spring 36, is mounted on the spindle.

The instrument 14 has a face plate 37 provided with a grooved or slotted bracket 38 adapted to receive a heat sensitive record sheet or card 40 with the side and bottom edges of the sheet in accurate registration with the axis of the spindle 32. The sheet has a clearance slot 42 to permit it to be inserted around the spindle and between the needle 34 and the face plate 37.

The sheet 40 may be plain or it may contain printing. The printing may take the form of identifying data such as the name of the patient, the date, the time of recording and the name of the person taking the pressure. It may also include a scale 44 calibrated in units or pressure. This scale is accurately located in relation to the edges of the sheet and is therefore in accurate spacial relation to the axis of the spindle 32 when the sheet is fully inserted in the recorded instrument. In some cases, as when the patient is not permitted to see the pressure readings, the scale 44 is omitted, in which case the record may be interpreted by a physician placing it in registration with a suitable transparent mask overlay on which a scale has been printed with alignment marks for registration with the edges of the card.

Figure 4:
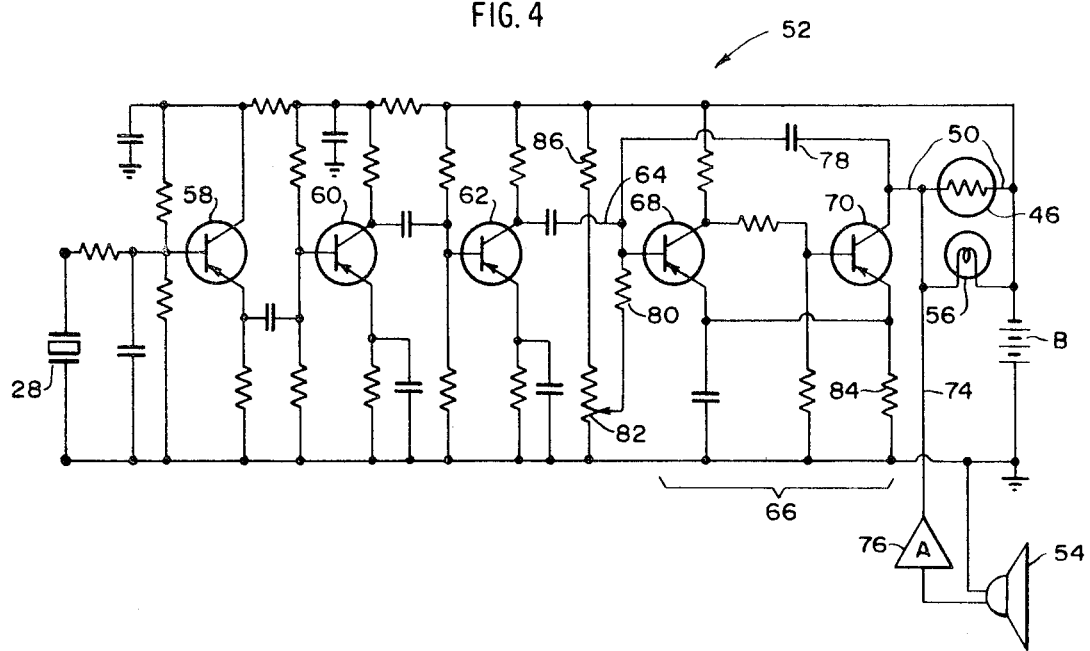
FIG. 4 is a partially simplified schematic circuit diagram of the instrument of FIG. 1.

A resistive heating element or hot wire 46 is mounted on the needle 34 by means of a bracket 48, and is connected by wires 50 with an amplifier generally designated at 52 in FIG. 4. The element 46 is preferably a semiconductor of known type, capable of generating substantial heat at a relatively low voltage.

Referring to FIG. 4, the circuit 52 amplifies blood pressure pulses produced in the microphone 28 and operates a loudspeaker 54, a light 56 and the heating element 46. By means of a suitable switch, not shown, one or more of these outputs may be selectively disconnected, if desired.

Figure 2:
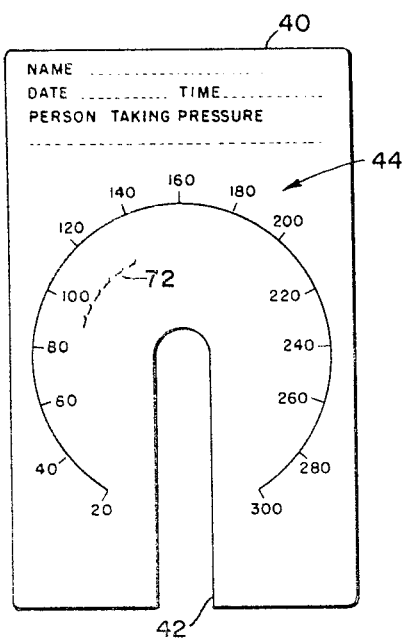
FIG. 2 illustrates a typical record sheet.

The circuit, described in greater detail below, comprises a series of transistor amplifying stages 58, 60 and 62 designed to amplify substantially the pulses from the microphone 28. The amplified pulses pass over a lead 64 to a monostable multivibrator 66 including transistors 68 and 70. In operation, the multivibrator causes each electrical pulse on the lead 64 to produce a voltage across the leads 50, energizing the heating element or semiconductor 46 and causing it to produce a pulse mark 72 (FIG. 2) on the sheet 40. To this end, the sheet 40 preferably has a heat sensitive surface of the kind generally used in office duplicators, commonly known as Thermofax copiers.

In operation of the instrument, the cuff 16 is placed on the patient and the bag 18 is inflated sufficiently to arrest the flow of blood, whereupon the pulses from the microphone 28 disappear. The sheet 40 is inserted in the instrument and the bleeder valve 22 is then opened a small amount to cause a gradual reduction in the pneumatic pressure. When the latter reaches the level at which it is just overcome by the systolic pressure, the flow of blood is initiated. This flow produces a sound impulse in the microphone 28 which is amplified and causes a mark 72 to be produced on the sheet 40. The pressure on the cuff is further reduced gradually until it reaches the level at which it becomes less than the diastolic pressure, at which point the microphone 28 ceases to be in efficient operative acoustical contact with the artery, and no further pulse marks 72 are produced on the sheet 40. The mark 72 corresponding to the highest pressure indicates the systolic pressure, and the mark corresponding to the lowest pressure indicates the diastolic pressure.

A lead 74 is connected with an amplifier 76, whereby the impulses that energize the resistance element or semiconductor 46 may also operate the loudspeaker 54. The light 56, which is mounted on the face of the instrument (FIG. 1), is connected in parallel with the heating element 46, whereby the loudspeaker and the light 56 respectively provide audible and visible indicia of the pulses within the range between the systolic and diastolic levels, which are coordinated with the momentary dial readings.

An important advantage of the present instrument resides in the fact that the resistance element 46 does not touch the sheet 40, does not produce a mechanical load on the needle 34, and therefore does not alter the response characteristics of the instrument.

The circuit 52 operates in the following manner. During the sustained absence of pulses from the microphone 28 the transistor 70 is nonconducting for reasons explained below. This prevents the flow of current from a battery B through the resistance element 46. This condition is reached at the initiation of a typical reading, when the pneumatic pressure in the cuff has been initially elevated above the systolic level.

When the pneumatic pressure is thereafter gradually reduced and reaches systolic level, a pulse is ultimately produced in the microphone. Succeeding pulses are also produced as the pressure is further reduced during each succeeding heartbeat until the diastolic level is reached, after which no further pulses are produced. When the first such pulse is produced at the systolic pressure level, the transistor 70 becomes conducting and its conduction is sustained to produce a mark 72 of significant length by an RC discharge circuit with a slow time constant, this circuit including a condenser 78 and resistors 80 and 82. After the transistor 70 ceases to conduct, the charge on the condenser 78 is rapidly replenished before the next succeeding pulse, that is, in the time interval between two heartbeats. Thus the resistance element or semiconductor 46 is energized by a sustained pulse on each heartbeat when the needle 34 is in the range between the systolic and diastolic levels, making a series of permanent marks 72 on the sheet 40 that extend between and define the systolic and diastolic levels.

During the sustained absence of pulses the transistor 68 conducts and the transistor 70 is biased to nonconduction by a current in a resistor 84. This current blocks the transistor 70 by bringing its emitter to a negative voltage with respect to its base. The emitter of the transistor 68 is held at the same potential as that of the transistor 70 but current in the former is not interrupted because a more negative bias is applied to its base by a voltage divider circuit comprising a resistor 86 and the resistor 82.

When a pulse is produced by the microphone 28, it is amplified by the stages 58, 60 and 62 and produces a positive pulse on the lead 64. This interrupts conduction in the transistor 68 and causes the base of the transistor 70 to swing more negative. The resulting conduction in the transistor 70, as a result of causing current flow in the resistance element 46, causes its collector to swing positive. The condenser 78, which is normally charged to a fraction of the potential of the battery B, begins to discharge through the resistors 80 and 82, sustaining a sufficient positive voltage on the base of the transistor 68 to keep it temporarily blocked for a substantial time prior to the arrival of the next pulse. When the base of the transistor 68 finally swings sufficiently negative, this transistor again begins to conduct, again blocking the transistor 70 and permitting the condenser 78 to recharge. The next pulse again interrupts conduction in the transistor 68 and causes conduction in the transistor 70 as previously described.

When the diastolic pressure level is reached no further pulses are produced in the microphone 28, and therefore no further marks 72 are made on the sheet 40.

In addition to the modifications described above, other changes and adaptations of the instrument can be carried out to suit particular applications. These will become apparent to one skilled in this art in the light of the foregoing description.

I claim:

1. A recording sphygmomanometer having, in combination, a cuff having an air closure and a microphone, inflating and deflating means for the closure, a manometer having a spindle, a pointer on the spindle and an electrical heater on the pointer spaced from the spindle, a hose connection between the air closure and the manometer, an amplifier having an input connection to the microphone and an output connection to the heater, and means to receive a heat sensitive recording sheet and to accurately locate said sheet in relation to the spindle, in nontouching relation to the heater and in position to expose the sheet to heat produced by said heater, said amplifier including means to energize the heater only upon the occurrence of blood pressure pulses detected by the microphone, and having means to sustain the time of heating for an appreciable portion of the interval between successive pulses.

2. The combination according to claim 1, in which the means to receive a beat sensitive recording sheet is a housing which supports the manometer and amplifier.

3. The combination according to claim 1, with said sheet, said sheet having a manometer scale printed thereon.

4. The combination according to claim 1, in which the amplifier includes a multivibrator and means to change the state of the multivibrator and to energize the heater simultaneously upon the occurrence of each pulse from the microphone.

* * * * *